US008474590B2

(12) United States Patent
Fabricius et al.

(10) Patent No.: US 8,474,590 B2
(45) Date of Patent: Jul. 2, 2013

(54) FRICTIONAL PART WITH A ZIG-ZAG OR UNDULATING CIRCUMFERENTIAL GROOVE IN THE FRICTIONAL SURFACE

(75) Inventors: Emilio Fabricius, Oftersheim (DE); Volker Reiners, Friedeburg (DE)

(73) Assignee: BorgWarner Inc., Auburn Hills, MI (US)

( * ) Notice: Subject to any disclaimer, the term of this patent is extended or adjusted under 35 U.S.C. 154(b) by 610 days.

(21) Appl. No.: 12/672,692

(22) PCT Filed: May 31, 2008

(86) PCT No.: PCT/EP2008/004347
§ 371 (c)(1),
(2), (4) Date: Feb. 9, 2010

(87) PCT Pub. No.: WO2009/021569
PCT Pub. Date: Feb. 19, 2009

(65) Prior Publication Data
US 2012/0118696 A1 May 17, 2012

(30) Foreign Application Priority Data

Aug. 15, 2007 (DE) .................... 10 2007 038 682

(51) Int. Cl.
*F16D 69/00* (2006.01)
(52) U.S. Cl.
USPC ............. 192/113.36; 192/113.22; 192/107 R (58) Field of Classification Search
USPC ...................................... 192/113.36
See application file for complete search history.

(56) References Cited

U.S. PATENT DOCUMENTS

| 3,972,400 | A | | 8/1976 | Howells |
| 5,176,236 | A | | 1/1993 | Ghidorzi et al. |
| 5,669,474 | A | * | 9/1997 | Dehrmann et al. ...... 192/113.36 |
| 5,878,860 | A | * | 3/1999 | Pavangat et al. ......... 192/113.36 |
| 5,979,621 | A | | 11/1999 | Schoder |

FOREIGN PATENT DOCUMENTS

EP          1473478 A1    11/2004

OTHER PUBLICATIONS

PCT/EP2008/004347 English Translation of Written Opinion, mailed: Mar. 2, 2010; 4 pages.

* cited by examiner

*Primary Examiner* — Rodney Bonck
(74) *Attorney, Agent, or Firm* — BrooksGroup (57) ABSTRACT

A friction part for a frictionally acting device comprising an annular friction surface which has an inner edge and an outer edge, with the friction surface having provided in it an encircling first groove which extends in zig-zag or undulating form between radially inner and radially outer deflection points, a plurality of second grooves which extend from the inner edge to the outer deflection points and a plurality of third grooves which extend from the outer edge into the encircling first groove and which open into the encircling first groove at opening-in points between the deflection points.

17 Claims, 4 Drawing Sheets

FRICTIONAL PART WITH A ZIG-ZAG OR UNDULATING CIRCUMFERENTIAL GROOVE IN THE FRICTIONAL SURFACE

The present invention relates to a friction part, for example a friction plate, for a frictionally acting device, for example a multiplate clutch, having an annular friction surface which has an inner edge and an outer edge, with the friction surface having provided in it an encircling first groove which extends in zig-zag or undulating form between radially inner and radially outer deflection points.

The prior art discloses friction parts for frictionally acting devices, in particular plates for multiplate clutches, which are composed substantially of an annular friction lining carrier and a friction lining which is attached to at least one side of the friction lining carrier so as to form an annular friction surface. The friction lining is generally composed of a fiber material, which is produced from a paper-containing material, or else of carbon. The friction lining carrier, in contrast, is usually formed by a sheet-metal part. To be able to reduce the high temperatures generated on account of the friction surface contact during a shift process and in particular during the permanent slip operation of a multiplate clutch or multiplate brake having a friction part of said type, or to be able to dissipate the correspondingly large amounts of heat, the known friction parts are conventionally impinged on by a flow of a suitable cooling and lubricating medium, which is preferably oil. To be able to supply and discharge the cooling and lubricating medium in an expedient manner, grooves are often formed in the friction surface of the friction lining, which grooves are either embossed in the friction lining or arranged between individual friction lining segments of the friction lining.

For example, friction linings are known which have an annular friction surface which has an inner edge and an outer edge, with the friction surface having provided in it an encircling first groove which extends in zig-zag or undulating form between radially inner and radially outer deflection points. The known friction parts having an encircling groove of said type have some disadvantages, however. It has been found in particular that those components of the friction lining which are arranged radially outside the encircling groove are subjected to particularly severe wear, which can be attributed to the relatively high circumferential speed and the associated relatively high temperature in said region. Those sections of the friction lining which are arranged outside the encircling groove therefore regularly tend to catch fire if the frictionally acting device is operated at particularly high rotational speeds. Furthermore, it has been found that the controllability of the frictionally acting device is limited when using the known friction parts. Furthermore, the known groove patterns generate a high drag torque, such that an undesired transmission of torque can take place even if the friction parts of the frictionally acting device are not in frictional engagement with one another.

It is therefore an object of the present invention to create a friction part for a frictionally acting device having a groove pattern in the friction surface, by means of which groove pattern the wear of the friction surface or of the friction lining is reduced, the drag torque is reduced and the controllability of a frictionally acting device having a friction part of said type is improved.

Said object is achieved by means of the features specified in patent claim 1. The subclaims relate to advantageous embodiments of the invention.

The friction part according to the invention is designed for a frictionally acting device. The friction part may for example be a friction plate for a multiplate clutch or a multiplate brake. The friction part has an annular friction surface. The annular friction surface may for example be formed by the friction part itself or by a friction lining which is attached to the friction part. The annular friction surface has an inner edge, that is to say a radially inwardly pointing edge, and an outer edge, that is to say a radially outwardly pointing edge, with an encircling first groove being provided in the friction surface, which groove may for example serve for the supply and discharge of a cooling and lubricating medium. Here, an encircling groove may be understood in particular to mean a groove which is continuous in the circumferential direction, preferably closed in the circumferential direction, and particularly preferably of annular design. The encircling first groove extends in zig-zag or undulating form between radially inner and radially outer deflection points in the annular friction surface. To enable a supply or discharge of cooling and lubricating medium into or out of the encircling first groove, the friction surface has provided in it a plurality of second grooves which extend from the inner edge of the friction surface to the outer deflection points. It is thus possible, for example, for a supply of cooling and lubricating medium into the encircling first groove to take place in a radially outward direction via said second groove. Conversely, the cooling and lubricating medium discharge from the encircling first groove may take place via said second grooves in the case of a supply of cooling and lubricating medium taking place in the radially inward direction. Furthermore, the friction surface has provided in it a plurality of third grooves which extend from the outer edge into the encircling first groove, with the third grooves opening into the encircling first groove at opening-in points between the deflection points. The third grooves may therefore serve for the discharge of cooling and lubricating medium out of the encircling first groove in the case of a supply of cooling and lubricating medium taking place in the radially outward direction. In the case of a supply of cooling and lubricating medium taking place in the radially inward direction, the third grooves may in contrast serve for the supply of the cooling medium into the encircling first groove.

By virtue of the fact that the second grooves extend to the outer deflection points while the third grooves open into the encircling first groove between the deflection points, a friction part is created which, when used in a frictionally acting device, surprisingly leads to particularly good controllability of said frictionally acting device. Furthermore, the temperature-induced wear behavior of those regions of the friction surface which are arranged in the radial direction outside the encircling first groove is improved significantly. Those regions of the friction surface which are arranged radially outside the encircling first groove are thus subjected to less temperature-induced wear than conventional friction parts with an encircling groove in the friction surface. The groove pattern according to the invention therefore produces equally effective cooling of the radially outer and radially inner regions of the annular friction surface in relation to the encircling first groove. Furthermore, a supply of cooling and lubricating medium into the encircling first groove in the radially outward direction via the second grooves leads to a dynamic pressure being generated at the outer deflection points, which dynamic pressure leads to a reduction of the drag torque.

In one advantageous embodiment of the friction part according to the invention, the encircling first groove comprises a plurality of first groove portions which extend in the one circumferential direction from the outer deflection points to the inner deflection points, and a plurality of second groove portions which extend in the same circumferential direction from the inner deflection points to the outer deflection points. The deflection points are to be understood here, and below, as those points in the encircling first groove at which the radial flow direction of the cooling and lubricating medium within the encircling first groove changes.

The encircling first groove may fundamentally be of undulating design, such that the first and second groove portions are of curved or arcuate design. However, in a further advantageous embodiment of the friction part according to the invention, it has been found that particularly effective cooling and sustainably improved controllability of the frictionally acting device may be obtained with a friction part of said type if the first and second groove portions of the encircling first groove are of rectilinear design. The zig-zag-shaped encircling first groove which is created in this way therefore improves both cooling and controllability. Furthermore, it is possible to achieve a further reduction in drag torque in this way, especially since the dynamic pressure at the outer deflection points is increased in the case of a supply of cooling and lubricating medium in the radially outward direction.

In one particularly advantageous embodiment of the friction part according to the invention, to obtain particularly effective cooling of those regions of the annular friction surface which are arranged in the radial direction outside the encircling first groove, both third grooves which open into the first groove portions of the encircling first groove and also third grooves which open into the second groove portions of the encircling first groove are provided.

In one particularly advantageous embodiment of the friction part according to the invention, to obtain effective cooling of those regions of the annular friction surface which are provided in the radial direction outside the encircling first groove in particular in the case of a supply of cooling and lubricating medium taking place in the radially outward direction, the friction surface also has provided in it fourth grooves which extend from the inner edge to the inner deflection points. Furthermore, the fourth grooves serve to provide complete filling of the encircling first groove, which has a positive influence not only on the cooling but rather also on the drag torque. Furthermore, it has been found that the controllability of a frictionally acting device is improved with a friction part of said type.

In one particularly advantageous embodiment of the friction part according to the invention, the friction surface also has provided in it first blind grooves which extend radially inward from the inner deflection points. Here, the first blind grooves have a surprisingly positive influence on the temperature-induced wear behavior of those regions of the friction surface which are arranged in the radial direction outside the encircling first groove. It was possible to observe that in particular those regions or friction lining segments which are arranged radially outside the encircling first groove and which are assigned or adjacent to the inner deflection points are cooled particularly effectively, such that said regions or segments are subjected to only a low amount of temperature-induced wear. The service life of the friction lining or of the friction surface can be sustainably lengthened in this way.

In one particularly advantageous embodiment of the friction part according to the invention, to obtain particularly effective cooling and lubrication of the entire friction surface of the friction part, successive inner deflection points in the circumferential direction are assigned in each case alternately a first blind groove or a fourth groove. This is to be understood to mean that a first blind groove is provided at one inner point, a fourth groove is provided at the subsequent inner deflection point in the circumferential direction, another first blind groove is provided at the subsequent inner deflection point, and so forth.

It has been found that a frictionally acting device can be controlled particularly effectively if said frictionally acting device has a further preferred embodiment of the friction part according to the invention, in which the first and second groove portions, which are joined at an outer deflection point, of the encircling first groove enclose an inner angle which is greater than 130°. Here, a magnitude of the inner angle of between 140° and 145° is preferred.

According to a further advantageous embodiment of the friction part according to the invention, the groove cross section of the encircling first groove at the deflection points is of the same size as the groove cross sections of the first and second groove portions of the encircling first groove. In this way, it is duly possible for a dynamic pressure, which counteracts a drag torque, to be built up at the deflection points, in particular at the inner deflection points, but it is not necessary for a permanent accumulation of a cooling and lubricating medium reservoir to occur here.

In a further advantageous embodiment of the friction part according to the invention, the smallest groove cross section of the second and/or fourth groove is larger or smaller, preferably larger, than the smallest groove cross section of the third groove. Here, the groove cross section refers to the cross-sectional area of the respective groove, with the groove cross section running in a plane transversely with respect to the direction of extent of the respective groove. Therefore, in the case of a supply of cooling and lubricating medium taking place in the radially outward direction via the second and/or fourth groove, the smallest groove cross section of the second and/or fourth groove should be larger than the smallest groove cross section of the third groove in order to obtain a dynamic pressure, which counteracts the drag torque, in the region of the deflection points, in particular in the region of the outer deflection point. In the case of a supply of cooling and lubricating medium in the radially inward direction, the dimensioning of the second and/or fourth groove and of the third groove respectively should be reversed.

According to a further preferred embodiment of the friction part according to the invention, the smallest groove cross section of the second and/or fourth groove is larger than the largest groove cross section of the third groove. In this way, a particularly effective temperature reduction is obtained in the region of the encircling first groove and therefore also in that region of the friction surface which is provided in the radial direction outside the encircling first groove, especially since an improved absorption of heat can be obtained on account of a slower flow of the cooling and lubricating medium within the encircling first groove.

In a further preferred embodiment of the friction part according to the invention, to enable a supply and discharge of the cooling and lubricating medium into and out of the encircling first groove substantially independently of rotational direction, the second grooves, the third grooves, the fourth grooves and/or the blind grooves extend along a radial line of the friction part. Here, said grooves extend preferably rectilinearly along the radial line, such that the friction part can be installed into the frictionally acting device independently of rotational direction, and incorrect assembly is prevented.

In a further advantageous embodiment of the friction part according to the invention, the friction part has a friction lining carrier which may for example be formed by an annular disk composed of sheet metal or steel, with the friction surface being formed by a friction lining which is attached to the friction lining carrier. The friction lining may for example be a friction lining which is adhesively bonded to the friction lining carrier. The friction lining is however not of single-piece design, but rather is composed of a plurality of spaced-apart friction lining segments, between which are formed the encircling first groove, the second grooves and the third grooves and if appropriate also the fourth grooves. In contrast to a single-piece friction lining, into which the abovementioned grooves are embossed, the segmented friction lining used here has the advantage that the production of the friction lining consumes less material, which leads to considerable cost savings in particular in the case of expensive paper friction linings. Friction lining material is therefore used only where the friction surface is actually to be formed, whereas friction lining material is dispensed with in the region of the grooves, the base of which is now formed by the friction lining carrier. Furthermore, the segmented friction lining may have a smaller thickness than a single-piece friction lining with embossed grooves. While the embossing of the grooves can also lead to an increased thickness of the friction lining in the edge region of the grooves, this is substantially eliminated in the case of a segmented friction lining, such that a friction lining having the described friction lining segments leads to improved controllability of the frictionally acting device having a friction part of said type.

In the case of the friction parts known from the prior art, at the outlet or inlet openings at the outer edge of the friction surface and at the inlet or outlet openings at the inner edge of the friction surface, damage to the adjoining friction lining segments often occurs. To prevent this, in a particularly preferred embodiment of the friction part according to the invention, the friction lining has, in relation to the encircling first groove, radially outer friction lining segments, that is to say friction lining segments arranged in the radial direction outside the encircling first groove, and radially inner friction lining segments, which are accordingly arranged in the radial direction within the encircling first groove, with those edges of the outer friction lining segments which face toward the third grooves and those edges of the inner friction lining segments which face toward the second and/or fourth grooves having an edge length of at least 2 mm, preferably more than 3 mm. With an edge length of at least 2 mm, it is ensured that a well-defined edge which faces toward the corresponding groove can be generated as the friction lining segments are punched out. Furthermore, it is ensured during operation that the friction lining segment which is attached to the friction lining carrier remains adhered in the region of said edge, without cracking or even being torn off. In this context, edges with an edge length of more than 3 mm have proven to be particularly successful. Furthermore, the spacing of the encircling first groove from the inner and outer edges of the friction surface produces particularly effective cooling of the friction part or of the friction surface.

In a further preferred embodiment of the friction part according to the invention, to protect the outer friction lining segments from temperature-induced wear to an even greater extent, the outer friction lining segments form in each case a partial friction surface, which is smaller than 60 mm$^2$ and preferably smaller than 50 mm$^2$, of the friction surface. In particular, the deflection points and opening-in points should be arranged in the friction surface in such a way as to automatically yield a size of smaller than 60 mm$^2$ for the partial friction surfaces of the outer friction lining segments. Particularly good temperature-induced wear behavior has been obtained here with outer friction lining segments whose partial friction surface is smaller than 50 mm$^2$. To obtain the above advantages with the inner friction lining segments, too, the inner friction lining segments preferably also form in each case a partial friction surface, which is smaller than 60 mm$^2$ and particularly preferably smaller than 50 mm$^2$, of the friction surface.

In a further preferred embodiment of the friction part according to the invention, to provide greater flexibility in the arrangement of the deflection points and of the opening-in points relative to one another, second blind grooves which extend radially inward from the outer edge are also provided. On account of the second blind grooves, the partial friction surface formed by the outer friction lining segment is reduced further or to the abovementioned advantageous dimension. The temperature-induced wear behavior of the outer friction lining segments can therefore be further improved by means of the second blind grooves. Furthermore, in the case of a supply of cooling and lubricating medium taking place in the radially outward direction, an underpressure can be generated in the region of the second blind groove which is provided at the outer edge, while an overpressure is generated at the outlet openings of the third grooves. In this way, the cooling and lubricating medium is sucked out of the region of the outlet openings of the third groove into the region of the second blind groove, as a result of which a particularly good cooling action in particular of the outer friction lining segments is obtained.

On account of the zig-zag-shaped or undulating design of the encircling first groove, those outer friction lining segments which are assigned to or adjoin the inner deflection points have a larger partial friction surface than the outer friction lining segments assigned to the outer deflection points. In a further preferred embodiment of the friction part according to the invention, to nevertheless obtain outer friction lining segments with partial friction surfaces of the preferred size throughout, the second blind grooves are provided in the outer friction lining segments assigned to the inner deflection points, particularly preferably in all the outer friction lining segments assigned to the inner deflection points.

In a further advantageous embodiment of the friction part according to the invention, to firstly enable effective cooling of the friction part in the region of the first and/or second blind grooves and secondly enable a regular exchange of the cooling and lubricating medium within the first and/or second blind grooves, the first and/or second blind grooves are tapered in the radially inward direction.

With regard to the above-described embodiment of the friction part according to the invention, a further preferred embodiment of the friction part according to the invention has proven to be advantageous in which the edges of the first and/or second blind grooves enclose an angle of between 20° and 25°. The abovementioned advantage was particularly pronounced here in embodiments in which the edges of the first and/or second blind grooves enclose an angle of between 22° and 23°.

In a further advantageous embodiment of the friction part according to the invention, the inner deflection points are arranged on an inner circle with a first radius and the outer deflection points are arranged on an outer circle with a second radius, with the circles being arranged concentrically with respect to one another and with the first radius being smaller than the second radius.

In a further preferred embodiment of the friction part according to the invention, the opening-in points are arranged on an interposed circle with a third radius, with the interposed circle being arranged concentrically with respect to the inner and outer circles and with the third radius being larger than the first radius and smaller than the second radius. The interposed circle is preferably a mean circle, that is to say the difference between the third radius and the first radius corresponds to the difference between the second radius and the third radius. Said arrangement of the deflection points and opening-in points results in particularly good controllability of the frictionally acting device having a friction part of said type.

In a further advantageous embodiment of the friction part according to the invention, the inner edge of the friction surface extends along an inner circumferential circle with a first circumferential circle radius and the outer edge of the friction surface extends along an outer circumferential circle with a second circumferential circle radius, with the circumferential circles being arranged concentrically with respect to one another and preferably also concentrically with respect to the inner and outer circles. In this way, the second grooves which extend from the inner edge to the outer deflection point can have in each case the same length, while the fourth grooves which may be provided if appropriate and which extend from the inner edge to the inner deflection points also have the same length. In this way, a uniform supply of cooling and lubricating medium to the encircling first groove is ensured.

As already explained above with regard to a different embodiment, the length of the second, third and fourth grooves should not fall below a predetermined value in order to prevent the edges of the adjoining friction lining segments being damaged during operation or even as the friction lining segments are punched out and attached. This may be prevented by means of a further preferred embodiment of the friction part according to the invention, in which the difference between the first radius and the first circumferential circle radius and/or the difference between the second radius and the second circumferential circle radius is preferably at least 3 mm, particularly preferably more than 4 mm.

A friction part which can be cooled particularly effectively and which has improved wear behavior of the friction surface is provided by a further advantageous embodiment of the friction part according to the invention, in which the ratio between the difference in the first and second circumferential circle radii and the difference in the first and second radii is preferably greater than 3 to 2, particularly preferably greater than 3 to 1.

According to a further preferred embodiment of the friction part according to the invention, the third grooves end at the opening-in points. Although the friction surface may also have provided in it further grooves which do not correspond to the abovementioned grooves, said further grooves should not open into the encircling first groove in the region of the opening-in point. Furthermore, the third groove should not intersect the encircling first groove at the opening-in point. It is correspondingly preferable for the second grooves to end at the outer deflection points. Furthermore, the fourth grooves preferably end at the inner deflection points. In said embodiments, the expedient flow behavior of the cooling and lubricating medium within the encircling first groove is not adversely affected by further grooves.

As already mentioned above, the friction surface of the friction part may have provided in it further grooves which are not one of the above-described grooves or blind grooves. However, in a further particularly preferred embodiment of the friction part according to the invention, to obtain the advantageous frictional, wear and control properties of the friction part according to the invention, more than 80%, preferably more than 90%, particularly preferably the whole of the groove pattern in the friction surface is formed by the encircling first groove, the second grooves and the third grooves and if appropriate the fourth grooves, the first blind grooves and/or the second blind grooves. Here, 100% of the groove pattern corresponds to the total area of all the grooves of the groove pattern when viewed in the axial direction. Alternatively, 100% of the groove pattern may also refer to the total volume of all the grooves of the groove pattern.

The invention is explained in more detail below on the basis of exemplary embodiments and with reference to the appended drawings, in which.

Figure 1:
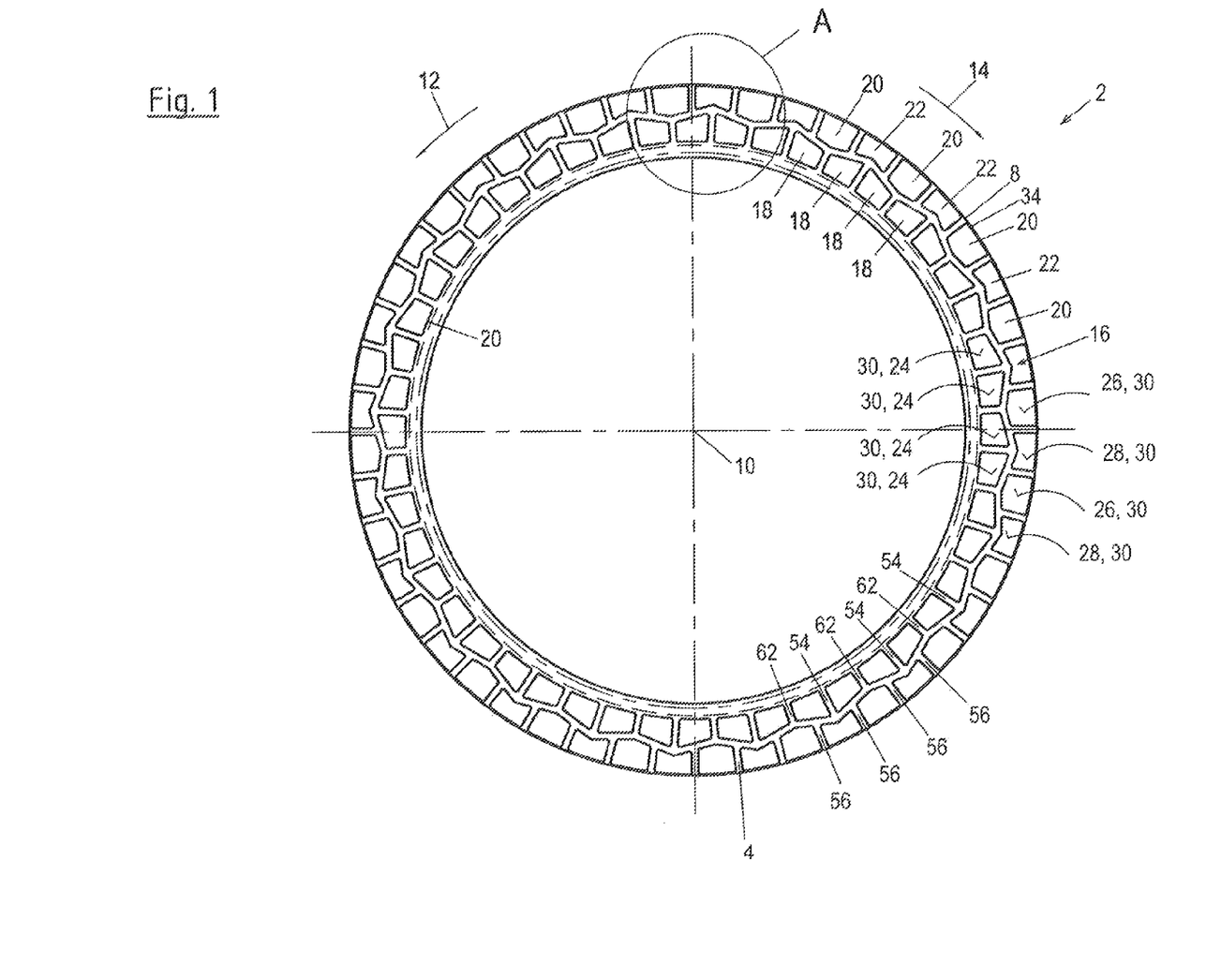
FIG. 1 shows a front view of a first embodiment of the friction part according to the invention.
Figure 2:
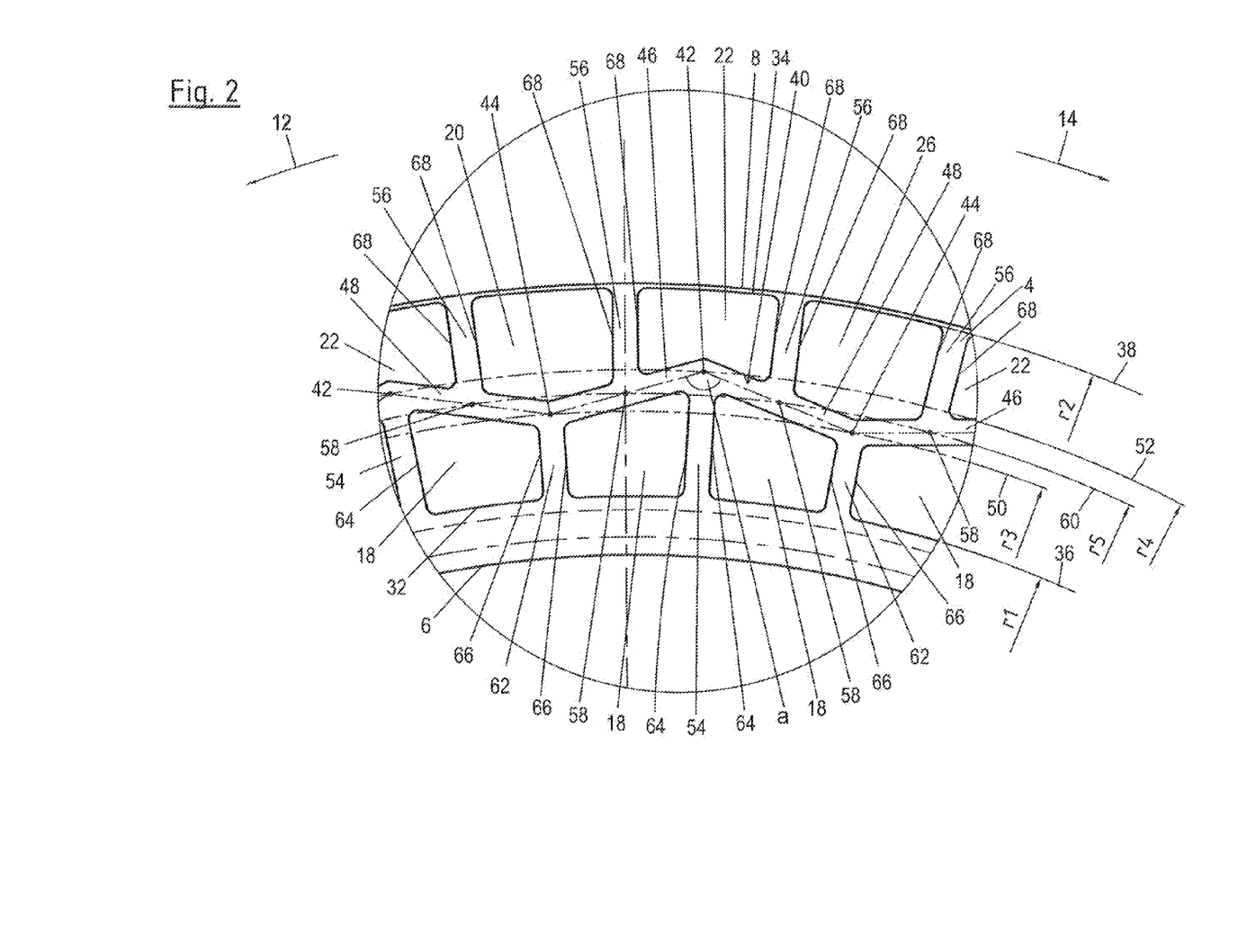
FIG. 2 shows an enlarged illustration of the detail A from FIG. 1.

FIGS. 1 and 2 show a first embodiment of the friction part 2 according to the invention for a frictionally acting device. The friction part 2 which is shown is embodied in the present case as a plate for a multiplate clutch or multiplate brake and has a friction lining carrier 4. The friction lining carrier 4 is embodied as an annular steel disk which extends in the plane of the drawing and comprises an inner edge 6 and an outer edge 8. A driving profile, preferably an internal toothing, is provided on the inner edge 6, which driving profile is indicated merely schematically in the figures and is formed in one piece with the annular disk. The internal toothing serves to rotationally fixedly connect the friction part 2 to a plate carrier, but enables an axial movement of the friction part 2 along the plate carrier. The present friction part 2 is consequently a so-called inner plate. It should however be noted that the friction part 2 according to the invention could likewise be an outer plate in which the driving profile, preferably an external toothing, would then be arranged on the outer edge 8. The rotational axis 10 of the friction part 2 extends perpendicular to the plane of the drawing page, while the opposite circumferential directions are indicated by the arrows 12 and 14.

In each case one friction lining 16, which in the illustrated embodiment is a paper friction lining, is arranged on the friction lining carrier 4 front side facing toward the viewer and on the friction lining carrier 4 rear side (not illustrated) facing away from the viewer. A description will be given below only of the design of the friction lining 16 on the front side of the friction lining carrier 4, but said description also applies correspondingly to the friction lining on the friction lining carrier 4 rear side facing away from the viewer. The friction lining 16 is formed as a so-called segmented friction lining and is composed of a plurality of spaced-apart friction lining segments 18, 20, 22. The friction lining segments 18 are thus formed as radially inner friction lining segments, while the friction lining segments 20, 22 form radially outer friction lining segments 20, 22, as will be explained in more detail further below. The friction lining segments 18, 20, 22 have partial friction surfaces 24, 26, 28 which face away from the friction lining carrier 4 and, together, form a substantially annular friction surface 30 of the friction part 2.

The annular friction surface 30 has an inner edge 32 which is spaced apart from the inner edge 6 of the friction lining carrier 4, and an outer edge 34 which substantially corresponds to the outer edge 8 of the friction lining carrier 4. Here, the inner edge 32 extends along an inner circumferential circle 36, which is indicated in FIG. 2 and which has a first circumferential circle radius $r_1$. The outer edge 34 of the friction surface 30 extends correspondingly along an outer circumferential circle 38 which is likewise indicated in FIG. 2 and has a second circumferential circle radius $r_2$. The two circumferential circles 36, 38 are arranged concentrically with respect to one another, with the first circumferential circle radius $r_1$ being smaller than the second circumferential circle radius $r_2$, that is to say $r_1 < r_2$. As already explained above, the friction lining 16 is composed of a plurality of spaced-apart friction lining segments 18, 20, 22, such that a groove pattern is formed between the friction lining segments 18, 20, 22, which groove pattern is formed in the friction surface 30 and is described in more detail below in particular with reference to FIG. 2.

The friction surface 30 firstly has provided in it an encircling first groove 40. The encircling first groove 40 extends continuously over the friction surface 30 in the circumferential direction 12 or 14 and is closed in the circumferential direction 12, 14, that is to say is of annular design. Here, the encircling first groove 40 abuts neither against the inner edge 32 nor against the outer edge 34 of the friction surface 30. The encircling first groove 40 extends in zig-zag or undulating form between radially outer deflection points 42 and radially inner deflection points 44, as indicated in particular in FIG. 2. The encircling first groove 40 thus comprises a plurality of first groove portions 46 which extend rectilinearly from the outer deflection points 42 to the inner deflection points 44 in the circumferential direction 12. The encircling first groove 40 also comprises a plurality of second groove portions 48 which extend rectilinearly from the inner deflection points 44 to the outer deflection points 42 in the same circumferential direction 12, so as to form a zig-zag-shaped first groove 40.

All the inner deflection points 44 are arranged on a common inner circle 50 with a first radius $r_3$, while all the outer deflection points 42 are arranged on a common outer circle 52 with a second radius $r_4$. The two circles 50 and 52 are arranged concentrically with respect to one another and concentrically with respect to the circumferential circles 36, 38, with the first radius $r_3$ being smaller than the second radius $r_4$. The difference between the first radius $r_3$ and the first circumferential circle radius $r_1$ and the difference between the second radius $r_4$ and the second circumferential circle radius $r_2$ is at least 3 mm, particularly preferably more than 4 mm. This means: $r_3 - r_1 \geq 3$ mm or $r_3 - r_1 > 4$ mm, and $r_2 - r_4 \geq 3$ mm or $r_2 - r_4 > 4$ mm. Furthermore, the ratio between the difference in the first and second circumferential circle radii $r_1$, $r_2$ and the difference in the first and second radii $r_3$, $r_4$ is greater than 3:2, particularly preferably greater than 3:1. This means: $(r_2 - r_1):(r_4 - r_3) > (3:2)$ and $(r_2 - r_1):(r_4 - r_3) > (3:1)$. With these specifications, a sufficient spacing firstly between the encircling first groove 40 and the inner edge 32 of the friction surface 30 and secondly between the encircling first groove 40 and the outer edge 34 of the friction surface 30 are ensured, such that the production and the functioning of the friction part 2 during operation are ensured, as will be explained in more detail further below.

The friction surface 30 also has provided in it a plurality of second grooves 54 which extend rectilinearly along a radial line from the inner edge 32 of the friction surface 30 to the outer deflection points 42 and open out into the encircling first groove 40. Here, the second grooves 54 end at the outer deflection points 42, that is to say the second grooves 54 do not cross the encircling first groove 40, or do not extend beyond the outer deflection point 42. Also, no further grooves which open into the encircling first groove 40 at the outer deflection point 42 are provided within the friction surface 30.

The annular friction surface 30 of the friction part 2 also has provided in it a plurality of third grooves 56 which extend in each case rectilinearly along a radial line from the outer edge 34 of the friction surface 30 into the encircling first groove 40. Here, the third grooves 56 open into the encircling first groove 40 at so-called opening-in points 58, with the opening-in points 58 being arranged along the encircling first groove 40 and between the deflection points 42, 44. One half of the third grooves 56 opens into the first groove portions 46 of the encircling first groove 40, while the other half of the third grooves 56 opens into the second groove portions 48 of the encircling first groove 40. The third grooves 56 also end in each case at the opening-in points 58 without crossing the encircling first groove 40 in said region. Also, no further grooves are provided which open into the encircling first groove 40 in the region of the opening-in points 58. The opening-in points 58 are arranged on an interposed circle 60 which has a third radius $r_5$. The interposed circle 60 is arranged concentrically with respect to the inner and outer circles 50, 52, with the third radius $r_5$ being larger than the first radius $r_3$ and smaller than the second radius $r_4$. The interposed circle 60 is preferably a mean circle, that is to say: $r_5 - r_3 = r_4 - r_5$.

The annular friction surface 30 also has provided in it fourth grooves 62 which extend in each case rectilinearly along a radial line from the inner edge 32 of the friction surface 30 to the inner deflection points 44 and open into the encircling first groove 40. The fourth grooves 62 end at the inner deflection points 44, that is to say the fourth grooves 62 do not cross the encircling first groove 40 in the region of the deflection points 44 and therefore do not project radially outward beyond the deflection point 44 or the encircling first groove 40. Also, the groove pattern does not have any further grooves which open into the encircling first groove 40 in the region of the inner deflection point 44 in addition to the fourth groove 62.

It has proven to be advantageous if the first and second groove portions 46, 48, which are joined at an outer deflection point 42, of the encircling first groove 40 enclose an inner angle α which is greater than 130° and preferably between 140° and 145°. The groove cross section of the encircling first groove 40, that is to say the cross section transversely with respect to the direction of extent of the encircling first groove 40, at the deflection points 42, 44 should also be of the same size as the groove cross sections of the first and second groove portions 46, 48 of the encircling first groove 40. In this way, it is sought in particular to eliminate an enlarged reservoir for the cooling and lubricating medium in the region of those deflection points 42, 44 into which the second or fourth grooves 54, 62 open. Furthermore, the smallest groove cross section of the second and fourth grooves 54, 62 should be larger or smaller than the smallest groove cross section of the third groove 56. It is thus preferable for the smallest groove cross section of the second and fourth grooves 54, 62 to be greater than the smallest groove cross section of the third groove 56 if the supply of cooling and lubricating medium takes place in the radially outward direction, such that the cooling and lubricating medium is slowed in the encircling first groove 40, which leads to an improved absorption of heat. The outer friction lining segments 20, 22 can be cooled particularly effectively in this way. The smallest groove cross section of the second and fourth grooves 54, 62 is larger than the largest groove cross section of the third groove 56 in order to further reinforce this advantage.

As already explained above, the friction lining segments 18, 20, 22 are divided into inner friction lining segments 18, which are arranged in the radially inward direction within the encircling first groove 40, and outer friction lining segments 20, 22 which are arranged in the radially outward direction outside the encircling first groove 40. The inner friction lining segments 18 have in each case an edge 64 which faces toward the second groove 54 and an edge 66 which faces toward the fourth groove 62. The outer friction lining segments 20, 22 also have in each case two edges 68 which face toward the third grooves 56. To prevent damage to said edges 64, 66, 68 during operation and even during the attachment of the friction lining segments 18, 20, 22 to the friction lining carrier 4, the edge length of the edges 64, 66, 68 is at least 2 mm, preferably more than 3 mm. Since the outer friction lining segments 20, 22 are subjected to particularly high thermal loading during the operation of the frictionally acting device, the groove pattern is designed such that the outer friction lining segments 20, 22 form in each case a partial friction surface 26, 28, which is smaller than 60 mm² and particularly preferably smaller than 50 mm², of the friction surface 30. In this way, the temperature-induced wear of the outer friction lining segments 20, 22 can be sustainably reduced.

In the first embodiment according to FIGS. 1 and 2, the groove pattern in the friction surface 30 is formed entirely by the encircling first groove 40, the second grooves 54, the third grooves 56 and the fourth grooves 62. The groove pattern may duly comprise further grooves which are not the first groove 40, the second grooves 54, the third 56 and the fourth grooves 62, but the above-stated special grooves should form a proportion of more than 80%, preferably more than 90%, of the groove pattern.

A second embodiment of the friction part 2 according to the invention will be described below with reference to FIGS. 3 and 4. The second embodiment largely corresponds to the first embodiment from FIGS. 1 and 2, and therefore only the differences in relation to the first embodiment will be discussed below, the same reference symbols are used for identical or similar parts, and the above description applies correspondingly in this regard.

Figure 3:
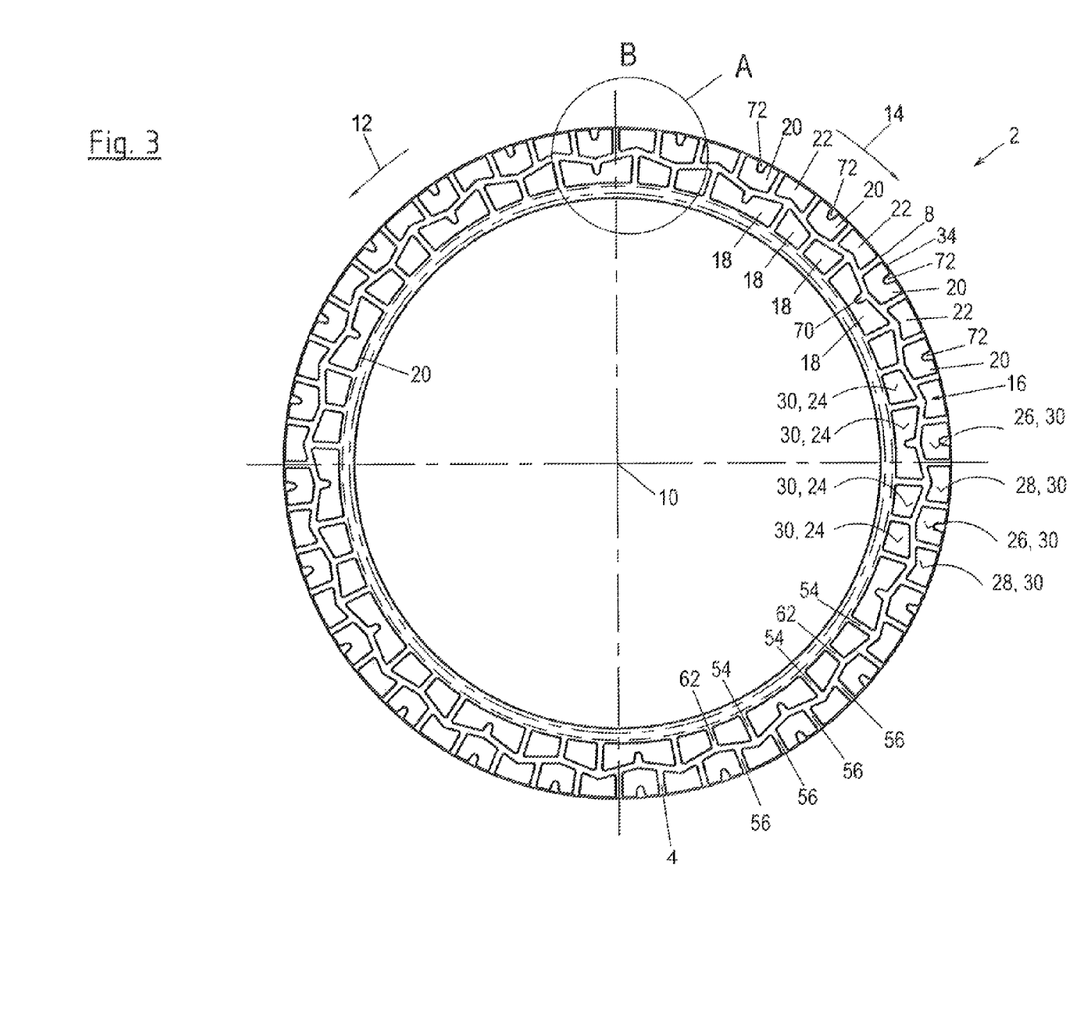
FIG. 3 shows a front view of a second embodiment of the friction part according to the invention.
Figure 4:
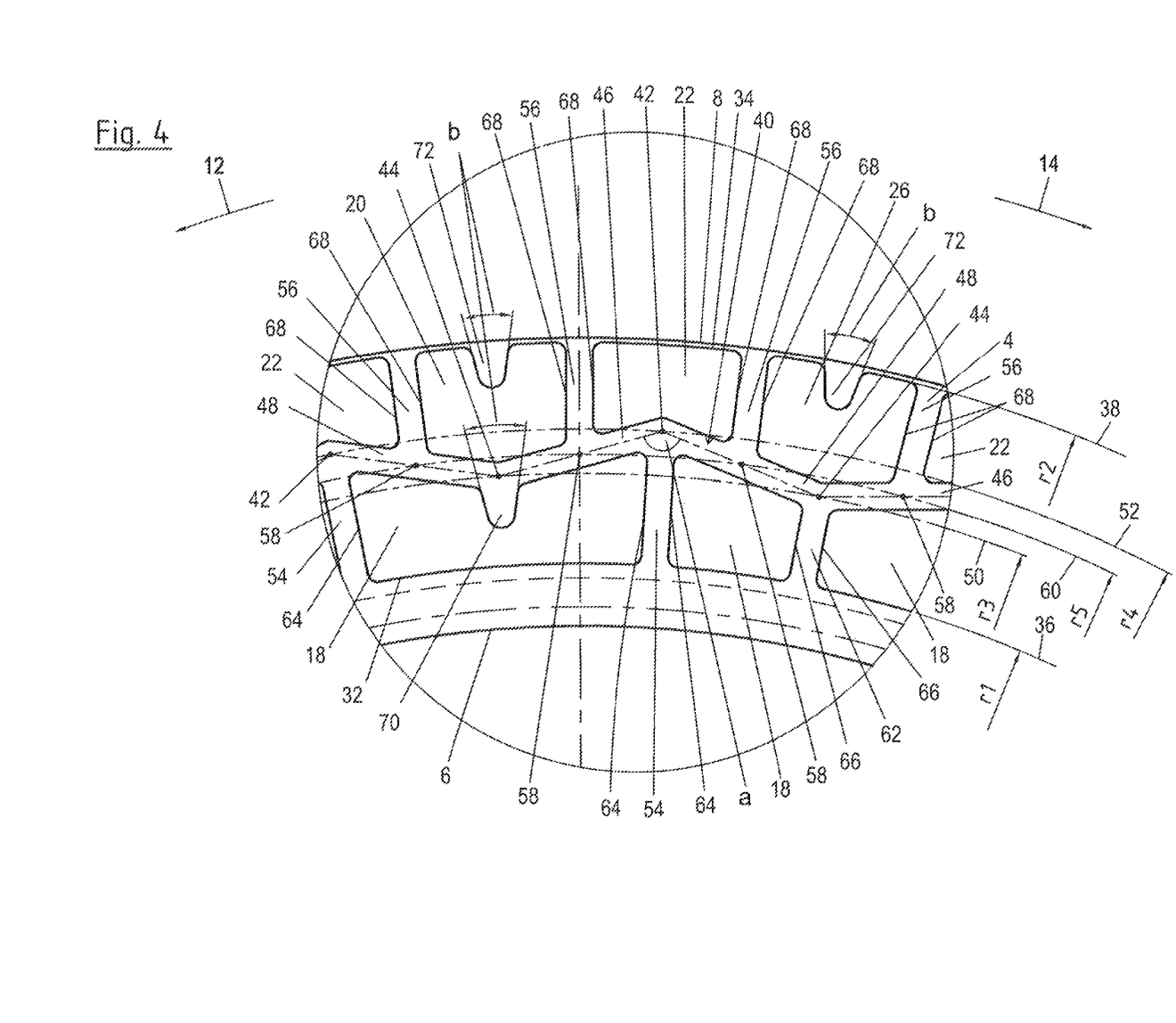
FIG. 4 shows an enlarged illustration of the detail B from FIG. 3.

In the second embodiment according to FIGS. 3 and 4, the friction surface 30 also has provided in it first blind grooves 70 which extend radially inward from the inner deflection points 44, but said blind grooves 70—as the name suggests—do not extend up to the inner edge 32 of the friction surface 30. However, the fourth grooves 62, which were described with reference to FIGS. 1 and 2 and which extend up to the inner edge 32 of the friction surface 30, are not dispensed with entirely. In fact, the successive inner deflection points 44 in the circumferential direction 12 or 14 are assigned in each case alternately a first blind groove 70 or a fourth groove 62. The first blind grooves 70 extend substantially rectilinearly along a radial line of the friction part 2. The first blind grooves 70 lead to particularly effective cooling of those outer friction lining segments 20 which are assigned to the inner deflection points 44, and outer friction lining segments 20 therefore generally have a larger partial friction surface 26 than the outer friction lining segments 22 with a partial friction surface 28.

To further improve the thermal load capacity of the outer friction lining segments 20 and of the entire friction part 2, the friction surface 30 also has provided in it second blind grooves 72 which extend rectilinearly inward along a radial line of the friction part 2 in each case from the outer edge 34 of the friction surface 30. Here, the second blind grooves 72 may be provided both in the outer friction lining segments 20 and also in the outer friction lining segments 22. It is however preferable for the second blind grooves 72 to be provided in those outer friction lining segments 20 which are assigned to the inner deflection points 44, in order to further reduce the relatively large partial friction surface 26 of said outer friction lining segments 20.

Such second blind grooves 72 should thus be provided in all of those outer friction lining segments 20 which are assigned to the inner deflection points 44.

For the cooling of the friction lining segments 18, 20, 22, it has proven to be particularly advantageous for the first and second blind grooves 70, 72 to be tapered in the radially inward direction. For the wear behavior, it has proven to be particularly advantageous for the edges of the first and second blind grooves 70, 72 to enclose an angle β of between 20° and 25°. In this context, an angle β of between 22° and 23° was particularly advantageous.

In the second embodiment according to FIGS. 3 and 4, the groove pattern in the friction surface 30 is formed entirely by the encircling first groove 40, the second grooves 54, the third grooves 56, the fourth grooves 62 and the blind grooves 70, 72. In this embodiment, too, however, the friction surface 30 may have provided in it further grooves which are not the first groove 40, the second grooves 54, the third grooves 56, the fourth grooves 62 and the blind grooves 70, 72. In this case, too, however, the above-described grooves 40, 54, 56, 62, 70, 72 should form a proportion of more than 80%, preferably more than 90%, of the groove pattern in the friction surface 30. Also, the further grooves should not open into the encircling first groove 40 in the regions of the deflection points 42, 44 and of the opening-in points 58.

LIST OF REFERENCE SYMBOLS

2 Friction part
4 Friction lining carrier
6 Inner edge
8 Outer edge
10 Rotational axis
12 Circumferential direction
14 Circumferential direction
16 Friction lining
18 Inner friction lining segment
20 Outer friction lining segment
22 Outer friction lining segment
24 Partial friction surface
26 Partial friction surface
28 Partial friction surface
30 Friction surface
32 Inner edge
34 Outer edge
36 Inner circumferential circle
38 Outer circumferential circle
40 First groove
42 Outer deflection points
44 Inner deflection points
46 First groove portions
48 Second groove portions
50 Inner circle
52 Outer circle
54 Second grooves
56 Third grooves
58 Opening-in points
60 Interposed circle
62 Fourth grooves
64 Edge
66 Edge
68 Edges
70 First blind grooves
72 Second blind grooves
$r_1$ First circumferential circle radius
$r_2$ Second circumferential circle radius
$r_3$ First radius
$r_4$ Second radius
$r_5$ Third radius
α Inner angle
β Angle

The invention claimed is:

1. A friction part (2) for a frictionally acting device, comprising an annular friction surface (30) which has an inner edge (32) and an outer edge (34), with the friction surface (30) having provided in it an encircling first groove (40) which extends in zig-zag or undulating form between radially inner and radially outer deflection points (44, 42), a plurality of second grooves (54) which extend from the inner edge (32) to the outer deflection points (42) and a plurality of third grooves (56) which extend from the outer edge (34) into the encircling first groove (40) and which open into the encircling first groove (40) at opening-in points (58) between the radially inner and radially outer deflection points (42, 44).

2. The friction part (2) as claimed in claim 1, wherein the encircling first groove (40) comprises a plurality of first groove portions (46) which extend in the one circumferential direction (12) from the outer deflection points (42) to the inner deflection points (44), and a plurality of second groove portions (48) which extend in the same circumferential direction (12) from the inner deflection points (44) to the outer deflection points (42),
with the first and second groove portions (46, 48) of the encircling first groove (40) being of rectilinear design,
with third grooves (56) which open into the first groove portions (46) of the encircling first groove (40) and third grooves (56) which open into the second groove portions (48) of the encircling first groove (40).

3. The friction part (2) as set forth in claim 1 further comprising fourth grooves (62) which extend from the inner edge (32) to the inner deflection points (44) are also provided.

4. The friction part (2) as set forth in claim 3 wherein the smallest groove cross section of the second or fourth groove (54, 62) is larger or smaller than the smallest groove cross section of the third groove (56).

5. The friction part (2) as set forth in claim 3 wherein the smallest groove cross section of the second or fourth groove (54, 62) is larger than the largest groove cross section of the third groove (56).

6. The friction part (2) as set forth in claim 3 wherein the friction part (2) further comprises a friction lining carrier (4), with the friction surface (30) of a friction lining (16) which is attached to the friction lining carrier (4) being formed from a plurality of spaced-apart friction lining segments (18, 20, 22), between which are formed the encircling first groove (40), the second grooves (54), the third grooves (56) and the fourth grooves (62),
with the friction lining (16) having, in relation to the encircling first groove (40), radially outer friction lining segments (20, 22) and radially inner friction lining segments (18), and with those edges (68) of the outer friction lining segments (20, 22) which face toward the third grooves (56) and those edges (64, 66) of the inner friction lining segments (18) which face toward the second or fourth grooves (54, 62) having an edge length of at least 2 mm.

7. The friction part (2) as claimed in claim 6, wherein the outer friction lining segments (20, 22) form in each case a partial friction surface (26, 28), which is smaller than 60 mm$^2$ of the friction surface (30).

8. The friction part (2) as set forth in claim 3 wherein the third grooves (56) end at the opening-in points (58), with the second grooves (54) ending at the outer deflection points (42) and the fourth grooves (62) ending at the inner deflection points (44).

9. The friction part (2) as set forth in claim 1 further comprising first blind grooves (70) which extend radially inward from the inner deflection points (44) are also provided,
with successive inner deflection points (44) in the circumferential direction (12, 14) being assigned in each case alternately a first blind groove (70) or a fourth groove (62).

10. The friction part (2) as set forth in claim 9 wherein at least one of the second grooves (54), the third grooves (56), the fourth grooves (62) or the first blind grooves extend along a radial line of the friction part (2).

11. The friction part (2) as set forth in claim 9 further comprising second blind grooves (72) which extend radially inward from the outer edge (34) are also provided,
with the second blind grooves (72) being provided in the outer friction lining segments (20) assigned to the inner deflection points (44).

12. The friction part (2) as set forth in claim 11, wherein at least one of the first or second blind grooves (70, 72) are tapered in the radially inward direction,
with the edges of the first or second blind grooves (70, 72) enclosing an angle of between 20° and 25°.

13. The friction part (2) as set forth in claim 1 wherein the encircling first groove (40) comprises a plurality of first groove portions (46) which extend in the one circumferential direction (12) from the outer deflection points (42) to the inner deflection points (44), and a plurality of second groove portions (48) which extend in the same circumferential direction (12) from the inner deflection points (44) to the outer deflection points (42), and wherein the first and second groove portions (46, 48), which are joined at an outer deflection point (42), of the encircling first groove (40) enclose an inner angle ($\alpha$) which is greater than 130°.

14. The friction part (2) as set forth in claim 1 wherein the encircling first groove (40) comprises a plurality of first groove portions (46) which extend in the one circumferential direction (12) from the outer deflection points (42) to the inner deflection points (44), and a plurality of second groove portions (48) which extend in the same circumferential direction (12) from the inner deflection points (44) to the outer deflection points (42), and wherein the groove cross section of the encircling first groove (40) at the radially inner and radially outer deflection points (42, 44) is of the same size as the groove cross sections of the first and second groove portions (46, 48) of the encircling first groove (40).

15. The friction part (2) as set forth in claim 1 wherein the inner deflection points (44) are arranged on an inner circle (50) with a first radius ($r_3$) and the outer deflection points (42) are arranged on an outer circle (52) with a second radius ($r_4$), which inner circle (50) and outer circle (52) are arranged concentrically with respect to one another, with the first radius ($r_3$) being smaller than the second radius ($r_4$),
with the opening-in points (58) being arranged on an interposed circle (60) on a mean circle (60) with a third radius ($r_5$), which mean circle (60) is arranged concentrically with respect to the inner and outer circles (50, 52), with the third radius ($r_5$) being larger than the first radius ($r_3$) and smaller than the second radius ($r_4$).

16. The friction part (2) as claimed in claim 15, wherein the inner edge (32) of the friction surface (30) extends along an inner circumferential circle (36) with a first circumferential circle radius ($r_1$) and the outer edge (34) of the friction surface (30) extends along an outer circumferential circle (38) with a second circumferential circle radius ($r_2$), with the circumferential circles (36, 38) being arranged concentrically with respect to one another and preferably also concentrically with respect to the inner and outer circles (50, 52), with the difference between the first radius ($r_3$) and the first circumferential circle radius ($r_1$) or the difference between the second radius ($r_4$) and the second circumferential circle radius ($r_2$) being at least 3 mm, with the ratio between the difference in the first and second circumferential circle radii ($r_1$, $r_2$) and the difference in the first and second radii ($r_3$, $r_4$) being greater than 3 to 2.

17. The friction part (2) as set forth in claim 1 wherein more than 80% of the groove pattern in the friction surface (30) is formed by the encircling first groove (40) and the second groove (54).

\* \* \* \* \*